United States Patent [19]
Nishio et al.

[11] Patent Number: 5,644,961
[45] Date of Patent: Jul. 8, 1997

[54] MACHINE TOOL WITH CANTILEVERED CHUCK MOVABLE ALONG THE X AND Z AXES

[75] Inventors: Osamu Nishio; Norio Tanaka; Takayasu Asano, all of Charlotte; Eddie M. Godwin, Monroe, all of N.C.

[73] Assignee: Okuma America Corporation, Charlotte, N.C.

[21] Appl. No.: 336,844

[22] Filed: Nov. 9, 1994

[51] Int. Cl.[6] .............................. B23B 13/02; B23B 19/02
[52] U.S. Cl. .................... 82/127; 82/129; 82/142; 29/27 R
[58] Field of Search ................... 29/27 R, 27 C, 29/33 P, 38 B; 82/127, 129, 142, 901

[56] References Cited

U.S. PATENT DOCUMENTS

| | | |
|---|---|---|
| 4,335,763 | 6/1982 | McGee . |
| 4,343,206 | 8/1982 | Douglass et al. . |
| 4,612,690 | 9/1986 | Baker . |
| 4,646,422 | 3/1987 | McMurtry . |
| 4,719,676 | 1/1988 | Sansone . |
| 4,831,906 | 5/1989 | Sugimoto et al. . |
| 4,930,380 | 6/1990 | Sasaki et al. . |
| 5,025,690 | 6/1991 | Myers ................................... 82/901 |
| 5,029,499 | 7/1991 | Okitsu .................................. 82/127 |
| 5,058,261 | 10/1991 | Kitamura ............................. 29/27 C |
| 5,088,361 | 2/1992 | Kojima et al. ...................... 29/27 R |
| 5,090,278 | 2/1992 | Mair et al. . |
| 5,165,313 | 11/1992 | Karr ..................................... 82/127 |
| 5,207,134 | 5/1993 | Wakatsuki . |

FOREIGN PATENT DOCUMENTS

| | | |
|---|---|---|
| 2602703 | 2/1988 | France . |
| WO81/00978 | 4/1981 | WIPO . |

*Primary Examiner*—M. Rachuba
*Assistant Examiner*—Kenneth J. Hansen
*Attorney, Agent, or Firm*—Bell Seltzer, Park & Gibson, P.A.

[57] ABSTRACT

A machine tool is provided having a spindle mounted for movement in a direction parallel to the spindle axis, the Z direction, and a direction perpendicular to the spindle axis, the X direction. The machine tool includes a machine bed and has means mounted to the machine bed for supporting at least one tool. At least one spindle is rotatably supported on the machine bed and includes a chuck for supporting a workpiece. The machine tool includes means mounting the spindle to the machine bed for movement in the Z direction and for independent movement in the X direction. Accordingly, the workpiece supporting means may be moved proximate to the tool supporting means and the workpiece may be engaged by a tool. The machine tool may further include feeder means for feeding bar stock to the workpiece supporting means so that the bar stock may be engaged by a tool. The machine tool may also include workpiece transfer means for facilitating the transfer of workpieces to and from the workpiece supporting means. A machine tool system embodying the machine tool also forms a part of the invention and includes a plurality of machine beds, each having a spindle and means mounting the spindles to the machine beds for moving the spindles in the Z and X directions. An associated method is also disclosed.

9 Claims, 6 Drawing Sheets

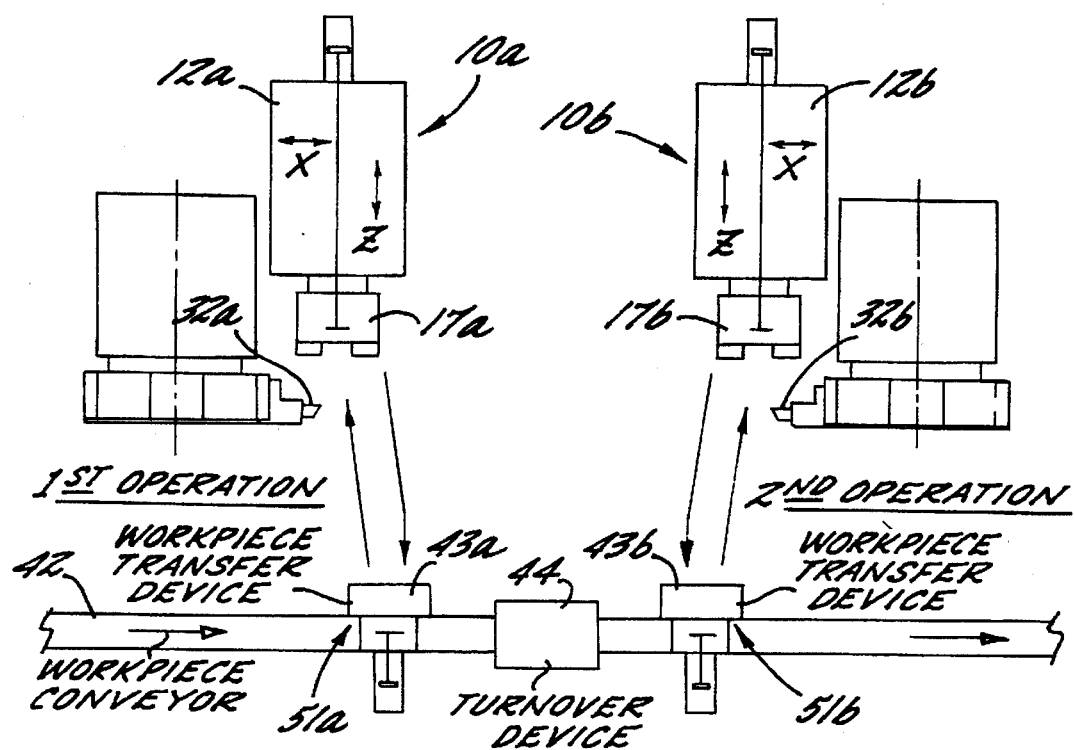
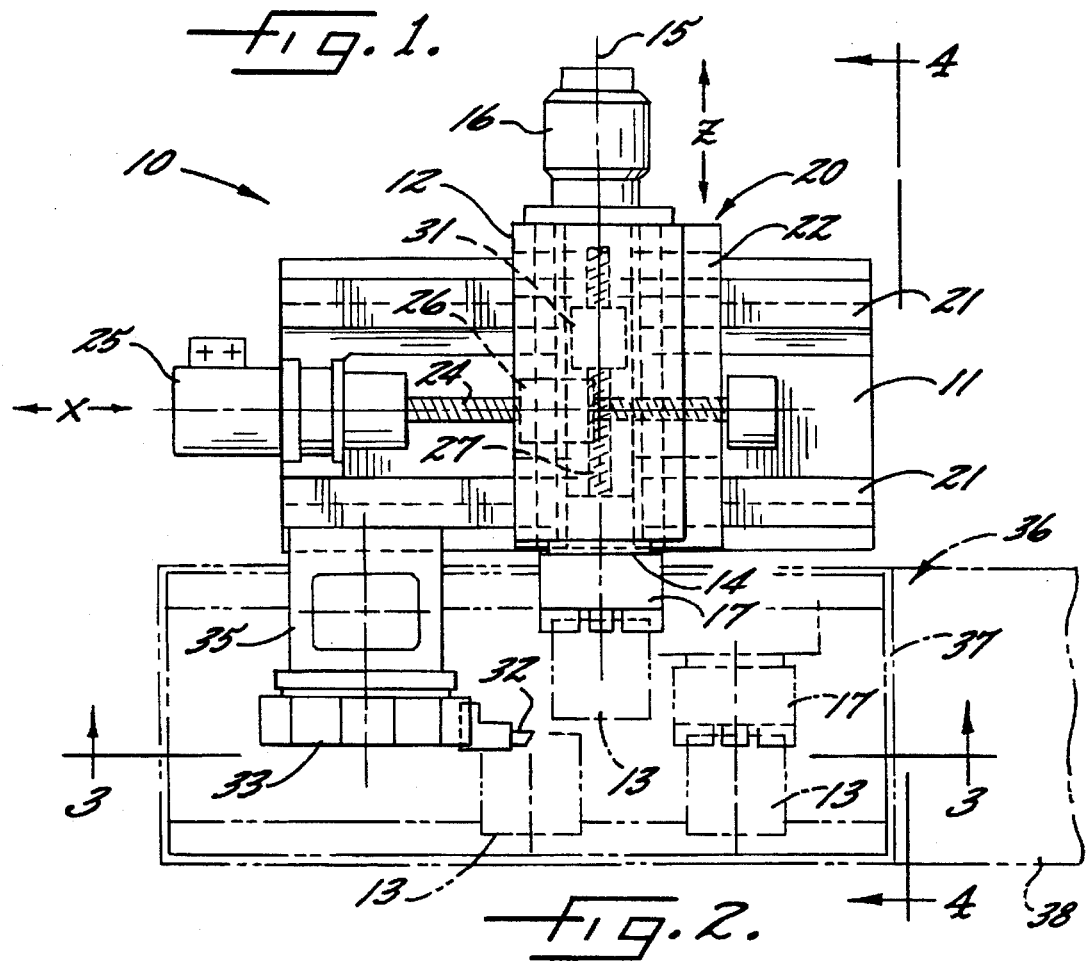

10

MACHINE TOOL WITH CANTILEVERED CHUCK MOVABLE ALONG THE X AND Z AXES

FIELD OF THE INVENTION

The present invention relates to machine tools having spindles, such as turning machines, wherein the spindle is mounted for translational movement.

BACKGROUND OF THE INVENTION

Machine tools, such as turning machines, are used in manufacturing to machine workpieces by removing material from the surface of the workpieces. A new surface is thereby generated which conforms more closely to the desired final shape of the part. Conventional turning machines include a spindle rotatably mounted in a headstock which is fixedly mounted to the bed of the machine. A workpiece supporting means, such as a chuck, is used to securely support a workpiece on the end of the spindle during the machining operation. The spindle is driven by a motor and the rotating workpiece is brought into engagement with a nonrotating cutting tool so that the desired amount of material can be removed.

The workpiece and tool are moved relative to each other in a direction parallel to the spindle axis (the "Z" direction) and in a direction perpendicular to the spindle axis (the "X" direction), or a combination of both, so that the tool cuts into the workpiece material at a predetermined rate and the desired shape is thereby generated. A liquid coolant is provided at the point of tool contact to cool and lubricate the cutting surfaces and to help remove chips formed by the cutting operation.

In conventional turning machines, the tool is often mounted on a tool post which is mounted to the bed of the machine. In machines where it is desirable to perform a multitude of operations using various tools, a tool turret may be used which incorporates a rotatable turret having the various tools mounted thereon. A desired tool can thus be rotated into the cutting position for engagement with the workpiece.

The tool post or turret is mounted to the bed of the machine in one or more guideways, or ways, which permit linear movement of the tool relative to the headstock. In conventional machines, the tool is mounted on a cross slide which allows the tool to move in the "X" direction. The cross slide is in turn mounted on a longitudinal slide which allows the tool to move in the "Z" direction. The tool can thus be moved in the proper relationship relative to the workpiece, however, many problems inhere in such conventional configurations.

First, conventional turning machines are not fully compatible with modern automated manufacturing techniques which require automated loading and unloading of workpieces from a workpiece conveying means, such as a conveyor belt. The configuration of the headstock and tool as mounted on the bed of conventional turning machines makes it difficult to provide a conveyor belt adjacent and below the chuck. Accordingly, a workpiece loader must be used to pick-up the workpiece from the conveyor belt and place it in the chuck of the machine. In addition, a workpiece unloader may be necessary to remove the workpiece from the chuck and place it on another conveyor belt. The workpiece loader and unloader thus add greatly to the cost and complexity of the machine. Moreover, if manual loading or unloading is performed, the configuration of conventional machines makes it difficult for the operator to reach the chuck.

Second, the chips and coolant are not easily removed from the cutting area in conventional turning machines. Errant chips can mechanically damage the various components of the ways and slides. Further, the chips and coolant are often quite hot and, if not effectively transported away from the cutting area, will transfer heat to the machine. This will cause thermal expansion of the bed, ways and slides which decreases the accuracy and precision of the machine. The headstock/tool configuration of conventional machines makes it difficult to effectively transport chips and coolant away from the machine because it is difficult to provide a chip conveyor below the chuck.

One prior attempt at solving these problems is published French patent application No. 2,602,703. The publication discloses a turning machine having the headstock mounted so that it can be moved in the "X" direction so as to facilitate the loading and unloading of workpieces, and the tool carriage is movable in the "Z" direction toward and away from the headstock. The turning machine of this publication is believed to require a precise delivery of the workpiece to the headstock, and in addition, the chip and coolant removal problem is not addressed.

Accordingly, it is an object of the present invention to provide an improved turning machine which alleviates the disadvantages of the prior machines as noted above.

It is another object of the present invention to provide a turning machine which facilitates easier loading and unloading of workpieces.

It is yet another object of the present invention to provide a turning machine which facilitates better chip and coolant removal.

SUMMARY OF THE INVENTION

The above and other objects of the present invention are achieved in the embodiments illustrated herein by the provision of a machine tool having a spindle mounted for movement in a direction parallel to the spindle axis, the Z direction, and a direction perpendicular to the spindle axis, the X direction. The machine tool includes a machine bed and has means mounted to the machine bed for supporting at least one tool, such as a tool turret, whereby one of the tools defines a cutting position. The spindle is rotatably supported on the machine bed for rotation about its axis and has a means for supporting a workpiece, such as a chuck, mounted at one end thereof.

The machine tool further includes means mounting the spindle to the machine bed for movement of the spindle in the Z direction and for independent movement of the spindle in the X direction. Accordingly, the workpiece supporting chuck may be moved proximate to the tool supporting means and the workpiece may be engaged by a tool at the cutting position to perform the desired machining operation.

The machine tool may further include at least one workpiece transfer station so that a workpiece may be engaged at the workpiece transfer station by the chuck, carried to the cutting position in both the Z and X directions, machined by engagement with the tool, and thereafter returned by the chuck to the same or a different workpiece transfer station. The transfer capability of the present invention thus allows improved workpiece loading and unloading.

The mounting means may include first guideways mounted on the bed and extending along the bed axis. A slide is mounted on the first guideways and includes second guideways which extend perpendicular to the first guideways for supporting the spindle thereon. A motor for rotating the spindle may also be mounted on the slide.

The machine tool may further include feeder means, such as a bar feeder, for feeding bar stock through the spindle to the workpiece supporting chuck so that the bar stock may be engaged by a tool. The machine tool may also include chip and coolant receiving means for receiving chips and coolant and conducting them away from the tool supporting means. The chip and coolant receiving means may extend through the machine bed.

Another embodiment of the machine tool includes a machine bed, means mounted to the machine bed for supporting at least one tool and first and second spindles rotatably mounted to the machine bed for rotation about respective first and second spindle axes. The machine tool further includes means mounting the spindles to the machine bed for independently moving each of the spindles in a direction parallel to the respective spindle axis and for independently moving each of the spindles in a direction perpendicular to the respective spindle axis, so that each of the chucks may be moved proximate to the tool supporting means.

The machine tool may further include a workpiece conveyor system which includes one or more workpiece receiving stations where workpieces are received by the chucks and one or more workpiece delivery stations where workpieces are delivered by the chucks. The conveyor system may also include a transfer conveyor extending between respective stations so that workpieces may be transferred between the spindles and successive machining operations may be performed thereon. A single chip and coolant receiving means may be disposed below the workpiece supporting means of both spindles for receiving chips and coolant and conducting them away from the tool supporting means.

An associated method of machining a workpiece also forms a part of the present invention and includes the steps of: supplying a workpiece to a spindle having a chuck; rotating the spindle and the workpiece about a spindle axis; moving the spindle in a direction parallel to the spindle axis and moving the spindle in a direction perpendicular to the spindle axis, so that the rotating workpiece is engaged by a tool and a machining operation is performed thereon; and removing the machined workpiece from the chuck.

BRIEF DESCRIPTION OF THE DRAWINGS

Some of the objects and advantages of the present invention having been stated, others will appear as the description proceeds when taken in conjunction with the accompanying drawings in which;

FIG. 1 is a schematic plan view a machine tool system embodying the present invention and showing the path traveled by a workpiece;

FIG. 2 is a plan view of one embodiment of the present invention having a single headstock;

DETAILED DESCRIPTION OF THE PREFERRED EMBODIMENTS

The present invention will now be described more fully hereinafter with reference to the accompanying drawings, in which preferred embodiments of the invention are shown, This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
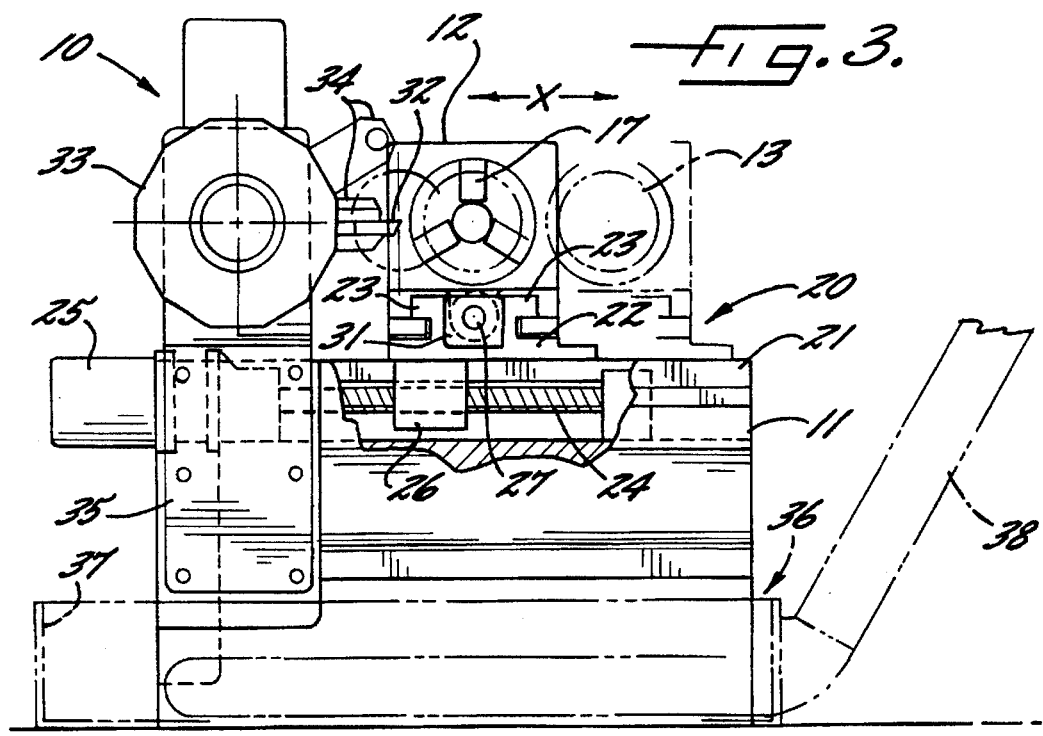
FIG. 3 is a partially sectioned front elevational view taken along line 3—3 in FIG. 2.
Figure 4:
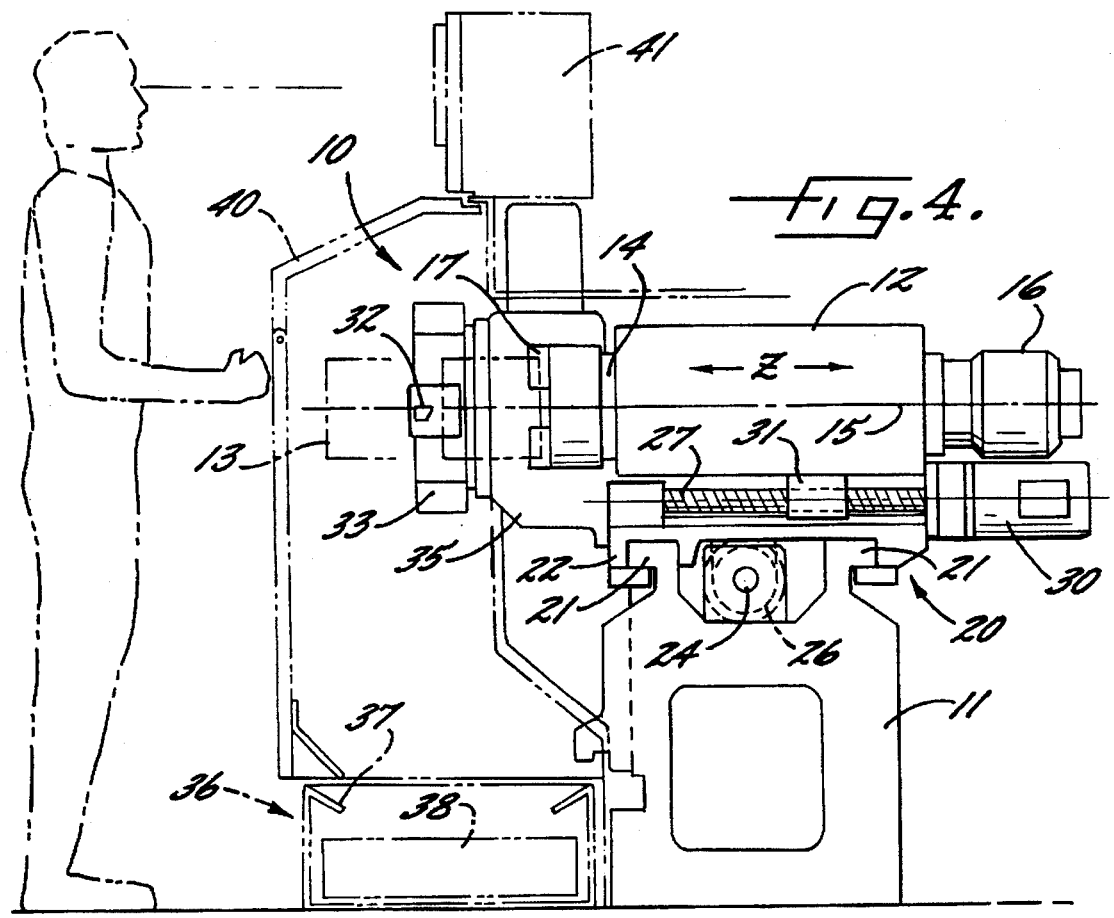
FIG. 4 is a side elevational view looking in the direction of line 4—4 in FIG. 2.

A preferred embodiment of machine tool 10 of the present invention is shown in FIGS. 2, 3 and 4 and includes a machine bed 11 having a headstock 12 mounted thereon for movement in both the "X" and "Z" directions, as defined above. The headstock 12 thus provides movement of a workpiece 13 for the machining operation and for the unloading and loading of the workpiece 13 from the machine 10.

The headstock 12 supports a spindle 14 for rotation about a spindle axis 15. A motor 16 is mounted to the headstock 12 and is operatively connected to one end of the spindle 14 to cause rotation of the spindle. The spindle 14 includes a workpiece supporting means 17 mounted at the end of the spindle opposite the motor 16 which may comprise a chuck, as shown in FIGS. 2, 3 and 4. The chuck 17 is preferably automated so that workpieces 13 can be engaged and released automatically. Alternatively, the workpiece supporting means 17 may comprise a collet chuck for engaging and supporting bar stock, as discussed below in connection with the embodiment shown in FIG. 5, or a face plate for use with awkward or irregularly shaped workpieces.

The spindle 14 is supported on the machine bed 11 by spindle moving means 20 for moving the spindle in the X and Z directions, both of which are preferably horizontal. Spindle moving means includes guideways 21, or ways, which extend in the X direction along the machine bed 11 as shown in FIG. 4. A headstock slide 22 is mounted on the bed ways 21 and has upper and lower horizontal surfaces corresponding to those of the ways. Thus, the headstock slide 22 is mounted on the bed ways 21 in a manner that allows translation only in the X direction, and is prevented from tipping relative to the machine bed 11. The corresponding surfaces of the bed ways 21 and the headstock slide 22 may be made of hardened steel or iron to minimize wear.

The headstock slide 22 includes ways 23 which extend in the Z direction, as shown in FIG. 3. The headstock 12 is mounted on the slide ways 23 and includes corresponding upper and lower horizontal surfaces. Accordingly, the headstock 12 is mounted on the headstock slide 22 so as to permit movement in the Z direction and is thus precluded from tipping relative to the headstock slide 22 and the machine bed 11. The corresponding surfaces can again be formed of hardened steel or iron to minimize wear.

The machine bed 11 includes a power screw 24 extending in the X direction between the ways 21 of the bed 11. The power screw 24 is driven by a motor 25 and extends through a fixed nut 26 mounted to the underside of the headstock slide 22. Accordingly, when the motor 25 is operated the power screw 24 rotates and the fixed nut 26 advances along the power screw. Thus, depending upon the direction of motor rotation, the headstock slide 22 can be advanced or withdrawn along the bed 11 in the X direction.

The headstock slide 22 includes a power screw 27 extending in the Z direction between the ways 23 of the slide. The power screw 27 is driven by a motor 30 and extends through a fixed nut 31 mounted to the underside of the headstock 12. Accordingly, when the motor 30 is operated the power screw 27 rotates and the fixed nut 31 advances along the power screw. Thus, depending upon the direction of motor rotation, the headstock 12 can be advanced or withdrawn relative to the headstock slide 22 in the Z direction. Accordingly, a workpiece 13 supported in the chuck 17 can be moved in the X or Z directions, or a simultaneous combination of both, depending upon the speed and direction of rotation of the power screw motors 25, 30.

A tool 32 is supported on the machine bed 11 and held in a cutting position by a tool supporting means 33. The tool supporting means may comprise a tool post (not shown) or an indexable tool turret as shown in FIGS. 2, 3 and 4. The tool turret 33 has a plurality of arms 34, two of which are shown in FIG. 3, for supporting a plurality of tools and is rotatable by a conventional drive system (not shown) so that any one of the plurality of tools mounted thereon may be rotated into the cutting position. This may be necessary when it is desired to change tool geometry or when a tool is worn.

The tool turret 33 is supported by a tool turret support 35 which preferably is fixedly mounted to the machine bed 11. Thus, as can be clearly seen in FIGS. 2 and 4, the cutting position of the tool 32 is fixed relative to the machine bed 11 and is not disposed over the bed, headstock slide 22 or associated ways 21, 23.

Chips of material are formed during the machining operation and it is desirable to remove the chips from the cutting area once they have been formed. A coolant spray, which is used to cool and lubricate the tool and workpiece surfaces, may also be used for washing the chips away from the cutting area. One of the advantages of the present invention is that the cutting position of the tool 32 is not located above the machine bed 11 and, accordingly, a chip and coolant receiving means 36 can be placed on the floor adjacent to the machine bed and below the cutting area. This configuration allows the relatively hot chips and coolant to be easily removed from the machine tool 10 such that heat from the chips and coolant is transferred away from the machine tool, which increases the dimensional stability of the machine.

In the illustrated embodiments, a catch pan 37 is used to receive the chips and coolant and a chip conveyor belt 38 is used to remove the chips from the catch pan. A cover shield 40 is disposed between the cutting position and the operator.

The various motor-driven components of the machine tool 10, such as the spindle 14, power screws 24, 27, tool turret 33, and automatic chuck 17, may all be connected to a central processor to coordinate the various functions and automate the operation of the machine. Accordingly, a control panel 41 is provided so that the operator may control the various components of the machine tool 10.

Another important advantage of the present invention is that it is adapted to provide improved loading and unloading of the workpieces 13 into the chuck 17. The ability of the headstock 12 to move in both the X and Z directions allows the workpiece 13 to be completely withdrawn from adjacent the tool 32 and machine bed 11. Accordingly, the chuck 17 can offer or accept the workpiece 13 at various workpiece transfer stations unobstructed by the tool 32 or the bed 11.

As illustrated in FIG. 2, a workpiece 13 supported in the chuck 17 is rotated by the spindle 14 and is brought into engagement with the tool 32. The headstock 12 may then be moved relatively slowly in the X and Z directions to generate the desired surface contour. After the machining operation is complete, the spindle 14 may then be withdrawn to a position which is removed from the tool 32 and not obstructed by the machine bed 11. As shown in FIG. 4, this allows the operator to unload the workpiece 13 while standing erect and minimizes the chance of injury to the operator's back. The next workpiece can then be easily loaded into the chuck 17 in the same manner.

A machine tool system embodying the present invention for use in automated manufacturing is shown in FIG. 1. The machine tool system includes first and second opposed machine tools 10a, 10b of the type illustrated in FIGS. 2, 3 and 4. The workpieces are introduced by a workpiece conveyor means 42, such as a conveyor belt or chute, and are conveyed to a first workpiece transfer device 43a at a workpiece transfer station 51a for facilitating the transfer of workpieces to and from the chuck 17a.

The specific structure of the workpiece transfer device 43a is not of critical importance and may have structural components dependent upon the size and shape of the workpiece and the type of workpiece conveyor 42 employed. For example, if the workpiece is conveyed by the workpiece conveyor 42 in an orientation which allows direct pick-up by the chuck 17a, the workpiece transfer device 43a may comprise nothing more than a stop on the workpiece conveyor at the workpiece transfer station 51a. Of course, if the shape of the workpiece so requires, the workpiece transfer device 43a may comprise a more complicated mechanical structure whereby the workpiece is picked up and oriented to facilitate direct pick-up by the chuck 17a. Similarly, the chuck 17a may deposit the workpiece directly onto the workpiece conveyor 42 at the workpiece transfer station 51a when transferring the workpiece to the conveyor.

The first headstock 12a is advanced in the X and/or Z directions to the workpiece transfer station 51a whereupon the automatic chuck 17a closes and engages the workpiece. The headstock 12a is then withdrawn, the spindle motor is started and the workpiece is brought into engagement with the tool 32a to perform the first desired machining operation. After the machining operation has been completed, the headstock 12a is again advanced to the workpiece transfer station 51a and the workpiece is transferred back to the workpiece conveyor 42 whereupon it is conveyed to a second workpiece transfer device 43b at a second workpiece transfer station 51b.

The workpiece may pass through turnover device 44 for reorienting the workpiece 180° before it is transferred to the second headstock 12b. It is often desirable to turn over a workpiece between successive machining operations so that the end of the workpiece machined during the first operation can be engaged by the chuck 17b of the second headstock 12b during the second operation. Accordingly, the second operation, which may be a mirror image of the first operation, can be performed on the end of the workpiece which was formerly engaged by the chuck 17a of the first headstock 12a. The turnover device 44 is shown to fully describe the various aspects of the present invention, however, as would be appreciated by one of ordinary skill in the art, a separate turnover device is not necessary if each of the workpiece transfer devices 43a, 43b reorients the workpiece by 90°.

The chuck 17b of the second headstock 12b picks up the workpiece in the manner described above with respect to the first headstock 12a and, after the second machining operation is performed at the second tool 32b, the second headstock returns the workpiece to the second workpiece transfer station 51b. The workpiece is placed back on the workpiece conveyor 42 and may continue on to other machining operations including finishing or other subsequent machining operations which may utilize machine tools according to the present invention.

Figure 5:
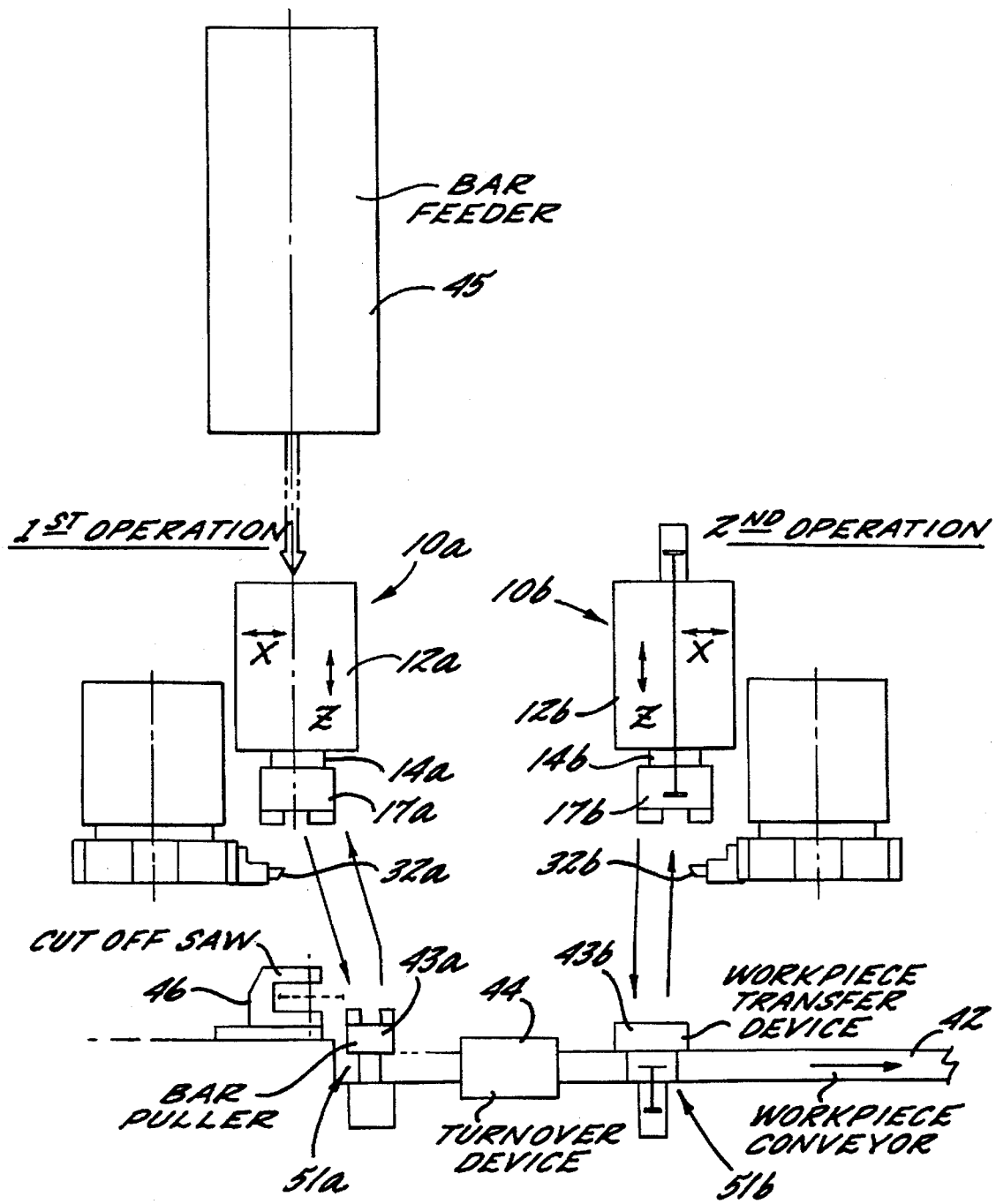
FIG. 5 is a schematic plan view of another machine tool system embodying the present invention and showing the path traveled by a workpiece as supplied by a bar feeder.

FIG. 5 illustrates another machine tool system embodying the present invention and which incorporates two machine tools 10a, 10b and a bar feeder 45 for supplying bar stock to a first headstock 12a according to the present invention. The first headstock 12a includes a hollow spindle 14a which may be driven by a motor offset from the spindle axis, such as by means of suitable gearing, to allow the bar to be fed into the spindle. Alternatively, a hollow motor of the type used in modern bar machine tools may be used.

Bar stock is loaded into the first headstock 12a by moving the headstock towards the bar feeder 45 so that the bar stock is fed through the spindle 14a to the workpiece supporting means 17a, which, as discussed above, may comprise a collet chuck. After the bar has been fed into the chuck 17a, it is brought into engagement with the tool 32a by moving the headstock 12a.

After the first machining operation has been performed on a segment of the bar, the headstock 12a is advanced in the X and Z directions, as shown in FIG. 5, until the machined segment of the bar is received by a first workpiece transfer device 43a, which may comprise a bar puller, at a first workpiece transfer station 51a. A cut off saw 46 removes the machined segment from the remainder of the bar stock, and the new workpiece is placed or allowed to drop onto a workpiece conveyor 42 for conveyance to a second workpiece transfer device 43b at a second workpiece transfer station 51b. A second machining operation may then be performed in accordance with the discussion above. This embodiment may also include a turnover device 44 as discussed above.

Another segment of the bar is then advanced in the first spindle 14a to begin preparation of a new workpiece. This may be accomplished by moving the first headstock 12a towards the bar puller 43a in the Z direction by an amount equal to the length of one segment. The bar puller 43a then grasps the end of the bar and the chuck 17a, which may comprise a collet chuck, is released. The first headstock 12a is then moved in the Z direction by an amount equal to one segment length, thus advancing the bar stock in the spindle 12a by the proper amount. The chuck 17a is then engaged and the bar puller 43a disengaged so that the headstock can be moved back adjacent to the tool 32a to perform the machining operation on the new workpiece segment.

Figure 6:
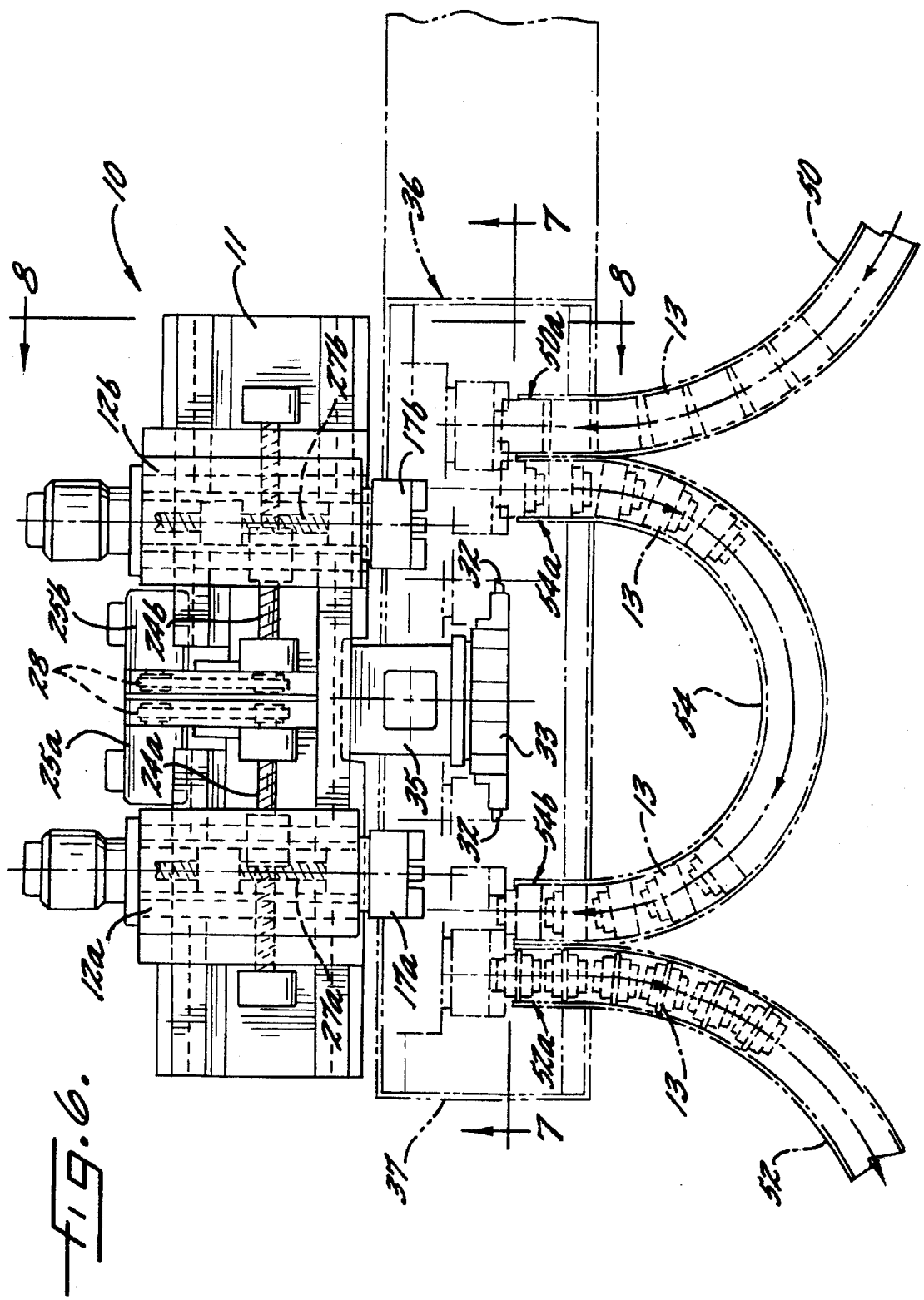
FIG. 6 is a plan view of another embodiment of the present invention having two headstocks.
Figure 7:
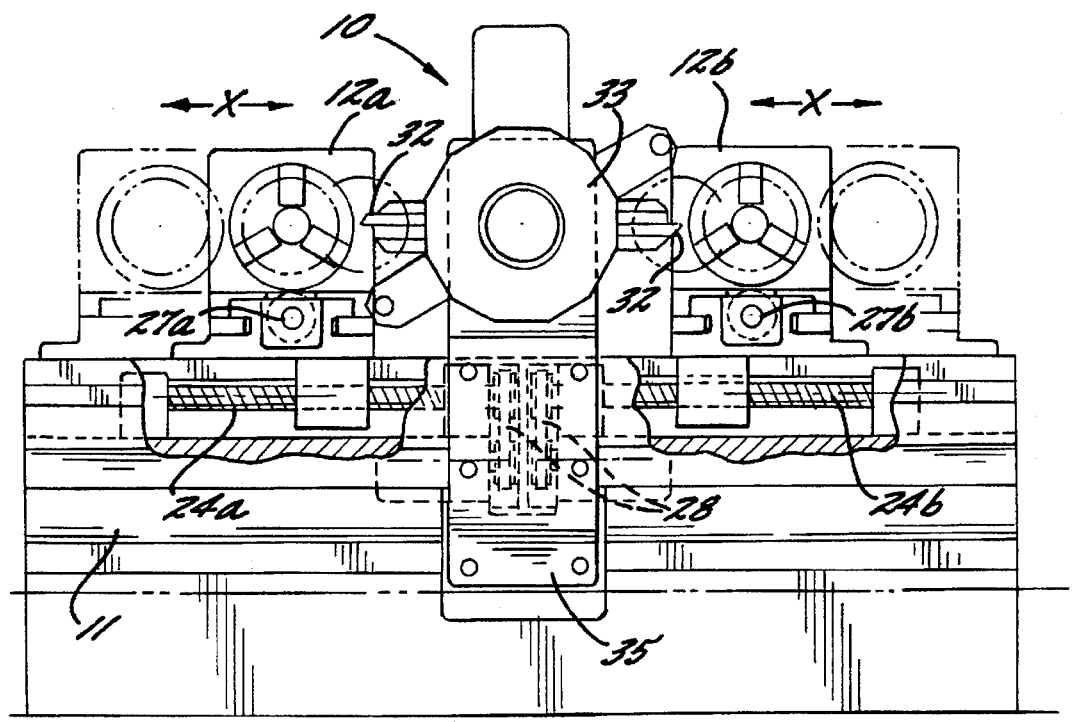
FIG. 7 is a partially sectioned front elevational view taken along line 8—8 in FIG. 6.
Figure 8:
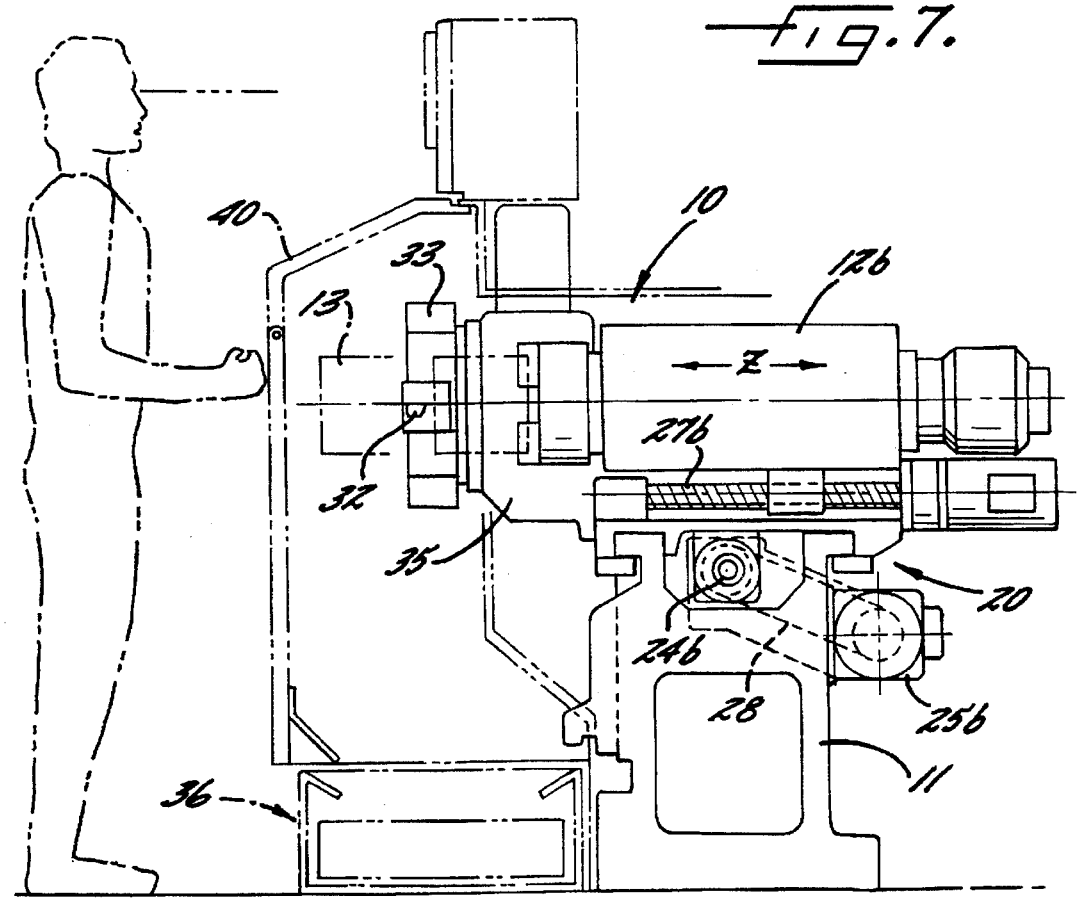
FIG. 8 is a side elevational view looking in the direction of line 8—8 in FIG. 6.

Another embodiment of the present invention is shown in FIGS. 6, 7 and 8. The embodiment comprises two movable headstocks 12a, 12b of the type discussed above but wherein both are mounted on a single machine bed 11. Each headstock 12a, 12b has a pair of respective power screws 24a, 24b, 27a, 27b for movement in the X and Z directions respectively. Accordingly, each headstock 12a, 12b is movable in both directions independently of the other headstock. Because of the proximity of the adjacent power screws 24a, 24b extending in the X direction, it may be necessary to connect the screw drive motors 25a, 25b to the respective power screws by means of a belt 28, as shown in FIGS. 6, 7 and 8.

One advantage of this embodiment, in addition to those discussed above, is that a single indexable tool turret 33 mounted to the machine bed 11 on a tool turret support 35 may be used. Accordingly, the tool turret 33 may have two cutting positions which allow two machining operations to be performed at the same time, thereby increasing efficiency. Also, as shown in FIG. 6, both of the cutting positions may be disposed over a single chip and coolant receiving means 36.

The embodiment of FIGS. 6, 7, and 8 also includes a workpiece conveyor system which includes an inlet conveyor 50 which defines a workpiece receiving station 50a on the side of the turret 33 adjacent the headstock 12b, and a workpiece outlet conveyor 52 which defines a delivery station 52a on the side of the turret 33 adjacent the headstock 12a. Also, a transfer conveyor 54 is positioned to deliver workpieces from one side of the turret to the other, and which includes a second delivery station 54a, positioned adjacent the receiving station 50a, and a second receiving station 54b positioned adjacent the delivery station 52a. The receiving station 50a and the delivery station 54a are within the range of movement of the chuck 17b of the headstock 12b as seen in dashed lines in FIG. 6, and the delivery station 52a and the receiving station 54b are within the range of movement of the chuck 17a of the headstock 12a. In this embodiment, the workpieces are reoriented 180° as they are conveyed along the conveyor 54, and thus there is no need for a separate turnover device.

Figure 9:
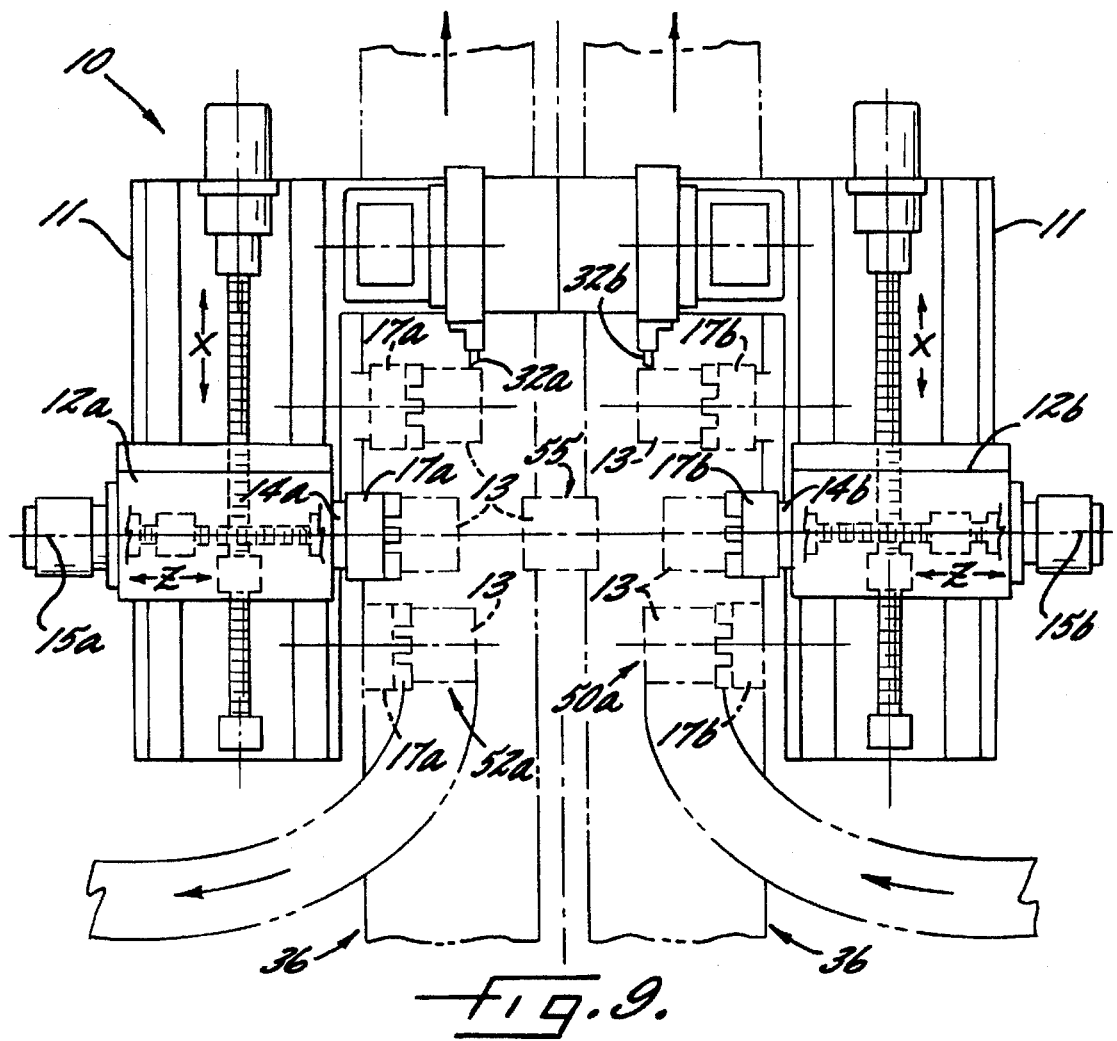
FIG. 9 is a plan view of another embodiment of the present invention having two opposed headstocks.
Figure 10:
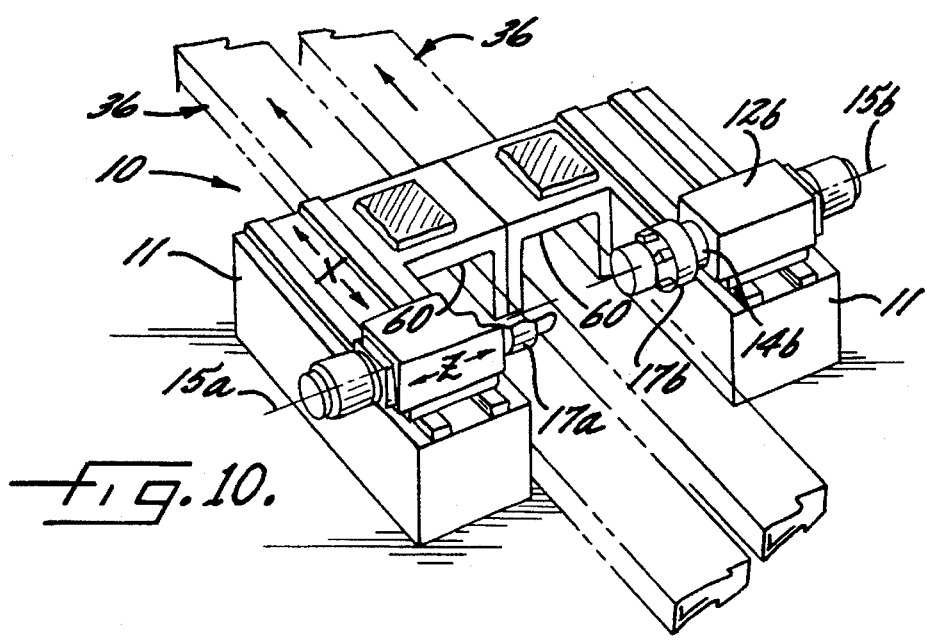
FIG. 10 is a perspective view of the embodiment shown in FIG. 9.

FIGS. 9 and 10 illustrate another embodiment of the present invention having two opposed headstocks 12a, 12b oriented so that the chucks 17a, 17b face each other. By moving one or both headstocks 12a, 12b along the respective X directions, the spindle axes 15a, 15b may be aligned, as shown in FIG. 9. Further, by extending one or both headstocks in the Z direction and towards each other, a workpiece 13 may be engaged simultaneously by both chucks 17a, 17b. Accordingly, the workpiece 13 may be transferred from one chuck to the other and the workpiece 13 will be reoriented by 180° which, as discussed above, may be desirable.

A workpiece 13 is first delivered to a workpiece receiving station 50a, either manually or by an inlet conveyor, and is engaged by the chuck 17b. The headstock 12b is then moved adjacent the tool 32b and the workpiece 13 undergoes a first machining operation. The headstock 12b is then moved in the Z and X directions so that the workpiece 18 is moved to a transfer position 55. Independently, the other headstock 12a is moved so that the chuck 17a engages the portion of the workpiece 13 opposite the portion engaged by the chuck 17b. The chuck 17b is released and the unmachined portion of the workpiece 13 may thereafter be machined. One advantage of this embodiment is that the rotational speeds of the spindles 14a, 14b may be synchronized and the workpiece may be transferred "on-the-fly," i.e., without stopping the spindles. After the second machining operation at the tool 32a, the headstock 12a is then moved to a delivery station 52a and the workpiece 13 can be conveyed away from the machine tool 10.

The machine bed 11 may also include one or more openings 60 therein and one or more chip and coolant receiving means 36 may extend therethrough. This embodiment provides superior chip and coolant transfer away from the machine tool 10 while maintaining physical and thermal machine bed stability.

In the drawings and the specification, there have been set forth preferred embodiments of the invention and, although specific terms are employed, the terms are used in a generic and descriptive sense only and not for purpose of limitation, the scope of the invention being set forth in the following claims.

What is claimed is:

1. A machine tool for machining workpieces comprising:
   a machine bed which includes an upper surface having peripheral side edges which define an upper periphery;
   a tool holder mounted to said machine bed so as to define a cutting position which is horizontally spaced from said peripheral side edges of said upper surface of said machine bed and which is outside of the periphery defined by said side edges;
   a spindle mounting a workpiece engaging chuck; and
   means rotatably mounting said spindle to said upper surface of said machine bed for rotation about a horizontal spindle axis and for selective movement in a horizontal direction parallel to said spindle axis and in a horizontal direction perpendicular to said spindle axis, and so that said workpiece engaging chuck may be moved proximate to said cutting position and the cutting operation may be performed at a location horizontally spaced from and outside of the periphery of said upper surface of said machine bed.

2. A machine tool as defined in claim 1 further comprising:
   workpiece conveyor means for conveying a workpiece to a workpiece transfer station which is horizontally spaced from said peripheral side edges of said upper surface of said machine bed and which is outside of the periphery defined by said side edges; and
   wherein said spindle mounting means is constructed and arranged so as to be adapted to move said workpiece engaging chuck proximate to said workpiece transfer station, and whereby a workpiece may be engaged by said workpiece engaging chuck, carried to said cutting position, machined by engagement with said tool, and then returned by said workpiece engaging chuck to said workpiece transfer station.

3. A machine tool as defined in claim 2 wherein said workpiece transfer station comprises a workpiece delivery station and a separate workpiece receiving station.

4. A machine tool as defined in claim 2 further comprising chip and coolant receiving means disposed beneath said cutting position for receiving chips and coolant from the machining operation.

5. A machine tool as defined in claim 4 wherein said chip and coolant receiving means comprises means for conducting the chips and coolant away from the machine tool.

6. A machine tool as defined in claim 2 wherein said spindle mounting means comprises first guideways mounted on said upper surface of said machine bed, a slide mounted on said first guideways and having second guideways extending in a direction perpendicular to said first guideways, and wherein said spindle is mounted on said second guideways of said slide.

7. A machine tool for machining workpieces comprising:
   a machine bed which includes an upper surface having peripheral side edges which define an upper periphery;
   a tool holder mounted to said machine bed so as to define a cutting position;
   workpiece conveyor means for conveying a workpiece to a workpiece transfer station which is horizontally spaced from said peripheral side edges of said machine bed and which is outside of the periphery defined by said side edges;
   a spindle mounting a workpiece engaging chuck; and
   means rotatably mounting said spindle to said upper surface of said machine bed for rotation about a horizontal spindle axis and for selective movement in a horizontal direction parallel to said spindle axis and in a horizontal direction perpendicular to said spindle axis, so that said workpiece engaging chuck may be moved proximate to said workpiece transfer station at a position horizontally spaced from said peripheral side edges of said machine bed and outside of the periphery defined by said side edges and a workpiece engaged by said workpiece engaging chuck, carried to said cutting position, machined by engagement with said tool, and then returned by said workpiece engaging chuck to said workpiece transfer station.

8. A machine tool as defined in claim 7 further comprising chip and coolant receiving means disposed beneath said cutting position and horizontally spaced from said machine bed for receiving chips and coolant from the machining operation.

9. A machine tool as defined in claim 7 wherein said workpiece transfer station comprises a workpiece delivery station and a separate workpiece receiving station.

* * * * *